United States Patent [19]

Takamatsu et al.

[11] Patent Number: 5,433,305
[45] Date of Patent: Jul. 18, 1995

[54] OVERRUNNING CLUTCH AND A ROLLING BEARING UNITED IN A CASING

[75] Inventors: Takanobu Takamatsu, Osaka; Kazuo Iga, Nara, both of Japan

[73] Assignee: Koyo Seiko Co., Ltd., Osaka, Japan

[21] Appl. No.: 77,643

[22] Filed: Jun. 17, 1993

[30] Foreign Application Priority Data

Sep. 4, 1992 [JP] Japan .............................. 4-062383 U
Oct. 26, 1992 [JP] Japan .............................. 4-074518 U
Mar. 16, 1993 [JP] Japan .............................. 5-011516 U

[51] Int. Cl.$^6$ ............................................. F16D 41/067
[52] U.S. Cl. ................................. 192/45; 192/110 B; 384/495
[58] Field of Search .............. 192/41 R, 44, 45, 110 B; 188/82.84; 384/495, 558

[56] References Cited

U.S. PATENT DOCUMENTS

| | | | |
|---|---|---|---|
| 3,011,606 | 12/1961 | Ferris et al. | 192/45 |
| 3,194,368 | 7/1965 | Benson et al. | 192/45 |
| 3,483,632 | 12/1969 | Triplett | 192/45 X |
| 3,990,555 | 11/1976 | Carullo | 192/45 |
| 4,718,781 | 1/1988 | Gérard | 384/495 |
| 5,074,393 | 12/1991 | Itomi | 192/45 |
| 5,078,243 | 1/1992 | Kanai et al. | 192/45 |

Primary Examiner—Richard M. Lorence
Attorney, Agent, or Firm—Popham, Haik, Schnobrich & Kaufman, Ltd.

[57] ABSTRACT

An assembly includes an overrunning clutch, a rolling bearing and a casing supporting them. An overrunning clutch-supporting portion of the casing has inwardly protruding portions that inter-engage with raised portions on an outer ring of the overrunning clutch in the direction of rotation of the outer ring. As a result, a clearance is defined between the inwardly protruding portions of the overrunning clutch-supporting portion and the raised portions of the outer ring. The overrunning clutch is automatically centered to a rotation shaft when used. An elastic ring is interposed in a predetermined compressed state between the outer ring and the overrunning clutch-supporting portion. Frictional resistance is produced between the outer ring and the overrunning clutch-supporting portion preventing the overrunning clutch from becoming shaky in the casing. The overrunning clutch is pressed against the casing by a spacer to produce the same frictional resistance between the overrunning clutch and the casing.

15 Claims, 6 Drawing Sheets

OVERRUNNING CLUTCH AND A ROLLING BEARING UNITED IN A CASING

BACKGROUND OF THE INVENTION

1. Field of the Invention

The present invention relates to an assembly of a roller-type overrunning clutch and a rolling bearing. The rolling-type overrunning clutch is provided with a shell-type outer ring and a plurality of rollers. The outer ring has an outer peripheral surface raised at several circumferential points.

2. Description of Related Art

Conventionally, in some mechanical devices, roller-type overrunning clutches and rolling bearings may be installed separately and adjacent in an axial direction at the point where a rotation shaft is linked to a housing.

With reference to FIG. 10, in order to link a rotation shaft 31 to a housing 32 with a rolling bearing 33 and an overrunning clutch 34, the rolling bearing 33 is directly fitted to the housing 32. The overrunning clutch 34 is fixedly mounted in advance to a mounting member 35 having a flange 35a. The flange 35a of the mounting member 35 is screwed to the housing 32, whereby the overrunning clutch 34 is mounted to the housing 32.

It is necessary that the overrunning clutch 34 and the rolling bearing 33 be centered to the housing 32 to prevent the rotation shaft 31 from causing a rotation runout. The overrunning clutch 34 and the rolling bearing 33 are separately mounted to the housing 32 as above. For the above centering, the rolling bearing 33 is therefore mounted to the housing 32 with a very small amount of adjustment of its radial attachment position to the rotation shaft 31. On the other hand, the mounting member 35 is attached to the housing 32 with its radial attachment position being adjusted a very small amount, so that the overrunning clutch 34 can be centered to the rotation shaft 31. However, such a centering operation is troublesome.

In contrast to the conventional construction illustrated in FIG. 10, other conventional constructions are disclosed in Japanese laid-open utility model publication No. 3-85,370, filed on Dec. 14, 1989 in the name of Katsuhiro Ikezawa and also in U.S. Pat. No. 3,011,606, filed on Jul. 26, 1957 in the name of Ernest A. Ferris et al. In those references, an overrunning clutch and a rolling bearing are united into a casing which is also used as a shell of the overrunning clutch. Further, another conventional construction is disclosed in Japanese laid-open utility model publication No. 4-19,923, filed on Jun. 12, 1990 in the name of Katsuhiro Ikezawa. A shell of an overrunning clutch and an outer ring of a rolling bearing are press-fitted into a casing into which the overrunning clutch and the rolling bearing are united into one body. both the overrunning clutch and the rolling bearing must be specially constructed and moreover, a very accurate and costly centering operation is required in their assembly.

SUMMARY OF THE INVENTION

Accordingly, it is a primary object of the present invention to provide an assembly of an overrunning clutch and a rolling bearing wherein the overrunning clutch can automatically be centered, thereby eliminating troublesome centering operations for attaching them to a housing.

Another object of the present invention is to provide an assembly of an overrunning clutch and a rolling bearing wherein the overrunning clutch can be placed in a stable state to prevent the overrunning clutch from colliding against a casing that supports the clutch and the bearing.

Other objects and a further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

In order to achieve these objects, in accordance with the present invention an assembly of an overrunning clutch and a rolling bearing comprises an overrunning clutch, and a rolling bearing comprises an overrunning clutch, a rolling bearing, and a casing. The overrunning clutch is provided with a shell-type outer ring having raised portions at its circumferential points. The rolling bearing is positioned adjacent the overrunning clutch in the axial direction of a rotation shaft. The casing has an overrunning clutch-supporting portion and a rolling bearing-supporting portion, covering the overrunning clutch and the rolling bearing with the overrunning clutch and the rolling bearing supported in their respective supporting portions. The overrunning clutch-supporting portion of the casing has inwardly protruding contact portions to define concavities corresponding to the raised portions on the outer peripheral surface of the shell-type outer ring of the overrunning clutch. The contact portions of the overrunning clutch-supporting portion of the casing engage in the rotation direction with the shell-type outer ring of the overrunning clutch such that a clearance is defined between the contact portions and the outer peripheral surface of the outer ring.

Also, in the assembly of the present invention, an elastic ring is interposed in a predetermined compressed state between the shell-type outer ring of the overrunning clutch and the overrunning clutch-supporting portion of the casing. Further, in the assembly of the present invention, a spacer is interposed between the shell-type outer ring and the overrunning clutch-supporting portion of the casing to press the outer ring against the overrunning clutch-supporting portion.

With the above arrangement, the casing supports the overrunning clutch such that it is radially movable with the clearance between the contact portions and the outer peripheral surface of the outer ring. The overrunning clutch is automatically centered at the same time when [only] the rolling bearing is centered to the rotation shaft. Accordingly, in the present invention, the troublesome centering operation required in conventional costructions becomes unnecessary.

Further, since the overrunning clutch united with the rolling bearing is loose-fitted into the casing with the clearance, the assembly of the present invention does not require highly accurate machining and assembly at the manufacturing stage. Therefore, the assembly can be manufactured at a low cost. Moreover, the overrunning clutch can stably be supported in the casing by frictional resistance produced due to the elastic ring or by being pressed against the spacer. The overrunning clutch is as a result prevented from colliding against the casing.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The present invention will be described in detail with reference to the accompanying drawings.

Figure 1:
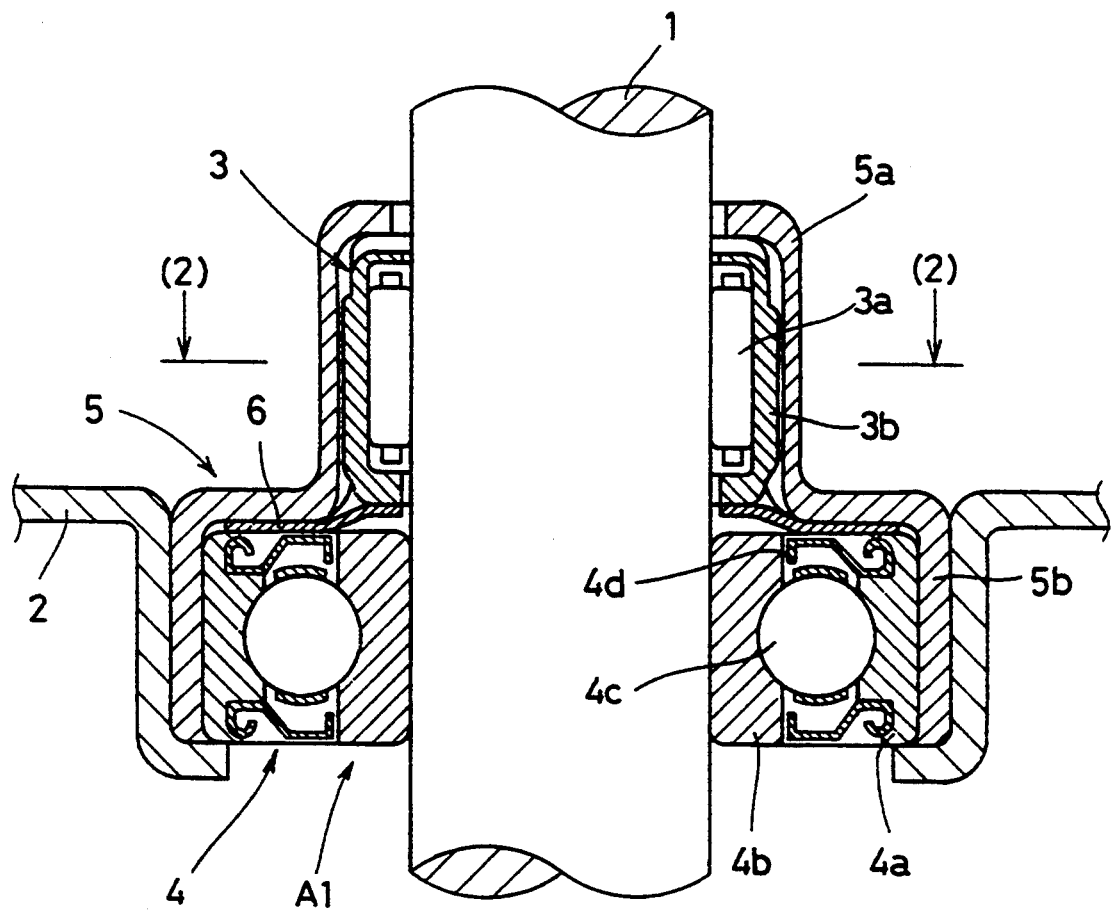
FIG. 1 is a cross-sectional view of an assembly of an overrunning clutch and a rolling bearing according to a first preferred embodiment of the present invention.
Figure 2:
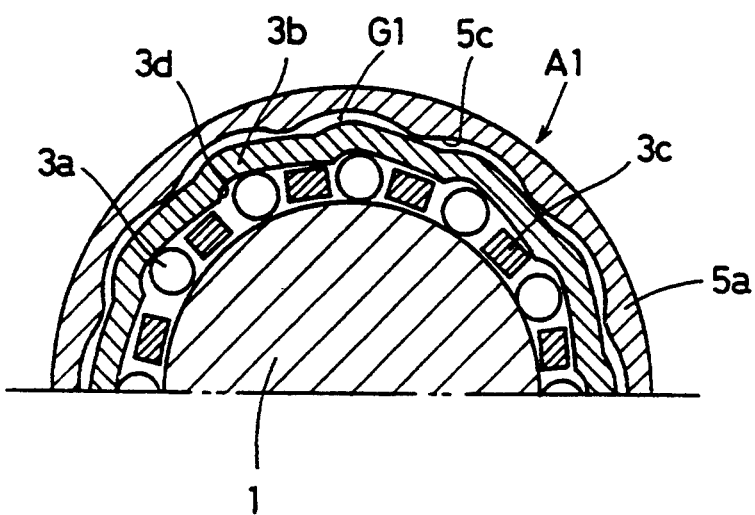
FIG. 2 is an enlarged half cross-sectional view of the united assembly, taken along the line 2—2 of FIG. 1.

FIG. 1 is a cross-sectional view of an assembly of an overrunning clutch and a rolling bearing according to a first preferred embodiment of the present invention. FIG. 2 is an enlarged half cross-sectional view of the assembly, taken along the line 2—2 of FIG. 1.

Referring now to FIGS. 1 and 2, an assembly A1 of the present invention is integrated into the place wherein a rotation shaft 1 is linked to a housing 2, and comprises an overrunning clutch 3, a roller bearing 4 such as a ball bearing, and a casing 5.

The overrunning clutch 3 comprises a plurality of rollers 3a, a cylindrical shell-type outer ring 3b and a retainer 3c with a pressing-down spring not shown. The outer ring 3b has cam grooves 3d as many as the rollers 3a. On the outer peripheral surface of the outer ring 3b are formed raised portions at circumferentially equal intervals. Each raised portion has a fixed length in the radial direction and is raised radially outwardly corresponding to the position at which the plural cam grooves 3d are formed. The rolling bearing 4, comprises an outer ring 4a, an inner ring 4b, a ball 4c and a retainer 4d. The rolling bearing 4 is positioned adjacent the overrunning clutch 3 through a spacer 6 in the axial direction of the rotation shaft 1.

Figure 11A:
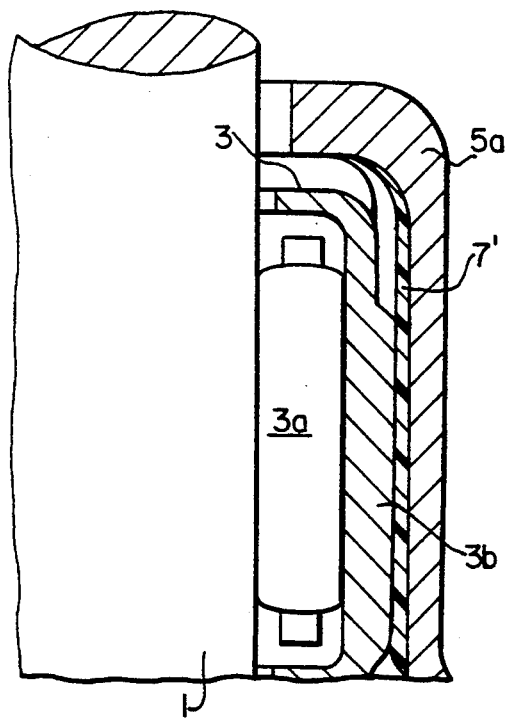
FIGS. 11a–11c show cross-sectional views of the buffer formed between the casing and the overrunning clutch.

The casing 5, which is used to support and cover the overrunning clutch 3 and the rolling bearing 4, is pressed in the form of a stepped cylinder with a small diameter portion 5a and a large diameter portion 5b. Over the inner peripheral surface of the casing 5, for example, synthetic resin is coated as a buffer 7' to prevent the overrunning clutch from colliding against the inner peripheral surface of the casing 5 as shown in FIG. 11a.

The small diameter portion 5a of the casing 5 in the first embodiment functions as an overrunning clutch-supporting portion. On the inner peripheral surface of the small diameter portion 5a, inwardly protruding contact portions 5c are formed that define concavities corresponding to the outer peripheral surface of the outer ring 3b of the overrunning clutch. The inwardly protruding contact portions 5c of the small diameter portion 5a of the casing 5 engage in the rotation direction of the rotation shaft 1 with the outer peripheral surface of the outer ring 3b such that there is a radially and circumferentially minute clearance G1.

The large diameter portion 5b of the casing 5 functions as a rolling bearing-supporting portion wherein the rolling bearing 4 is fixedly supported. These small diameter portion 5a and the large diameter portion 5b are adjacent each other in the axial direction of the rotation shaft 1. The overrunning clutch 3 and the rolling bearing 4 are held in the small diameter portion 5a and the large diameter portion 5b, respectively, thus being positioned adjacent each other in the axial direction.

The above assembly A1 is integrated into the place wherein the rotation shaft 1 is linked to the housing 1. When the assembly A1 is constructed the casing 5 is fixed to the housing 2, whereby the assembly A1 is attached to the housing 2.

With this attachment, the overrunning clutch 3 is slightly moved radially within the range that the clearance G1 allows and thus is automatically centered to the rotation shaft 1. Accordingly, the assembly A1 of the present invention does not need any troublesome centering operation similar to that required in conventional devices. Further, since the overrunning clutch 3 is automatically centered at the time of the attachment, it is unnecessary to accurately center the overrunning clutch 3 with the rolling bearing 4 in manufacturing the assembly A1. The load for centering in manufacturing the assembly A1 is therefore largely reduced. Moreover, the overrunning clutch 3 and the rolling bearing 4 may be constructed from standard components thus lowering the manufacturing costs of the assembly A1.

Figure 11B:
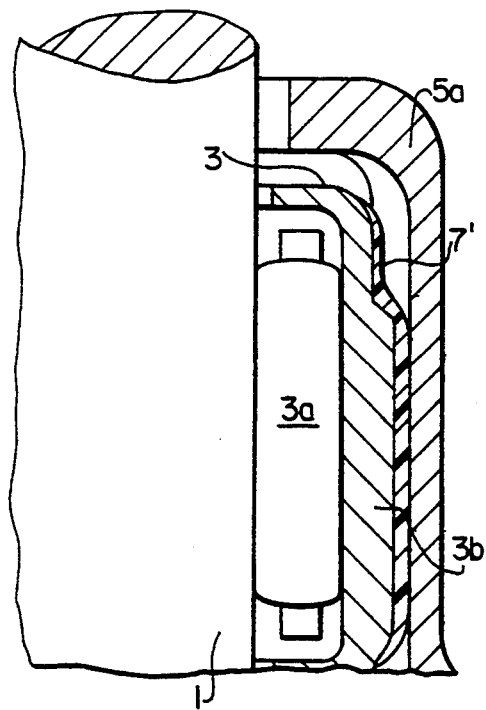
Figure 11C:
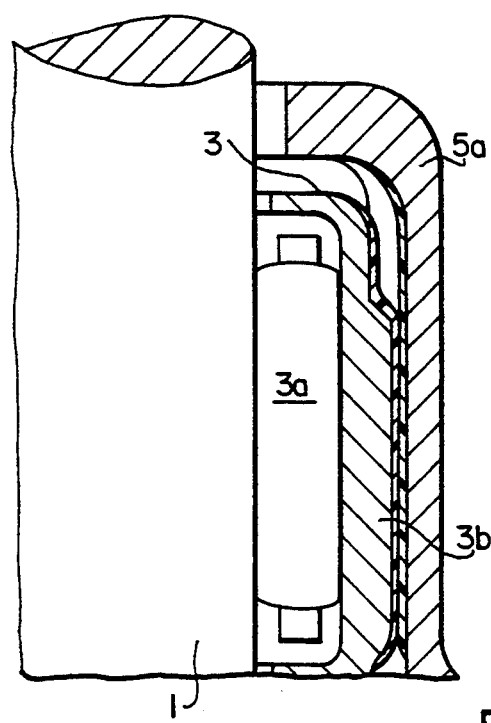

When the rotation shaft 1 is rotated, the overrunning clutch 3 of the assembly A1 becomes shaky in the small diameter portion 5a of the casing 5. This is because there is the clearance G1 between the small diameter portion 5a and the outer ring 3b of the overrunning clutch 3. However, a synthetic resin acting as a buffer 7' may be coated over the inner peripheral surface of the casing 5; the synthetic resin prevents the problem of the outer ring 3b contacting directly with the small diameter portion 5a. Noise generation as a result is largely suppressed. The 7' is formed on the inner peripheral surface of the casing 5; it may also be done on the outer peripheral surface of the overrunning clutch 3, or on both of them if necessary. The different forms of the buffer 7' are shown in FIGS. 11a–11c.

Figure 3:
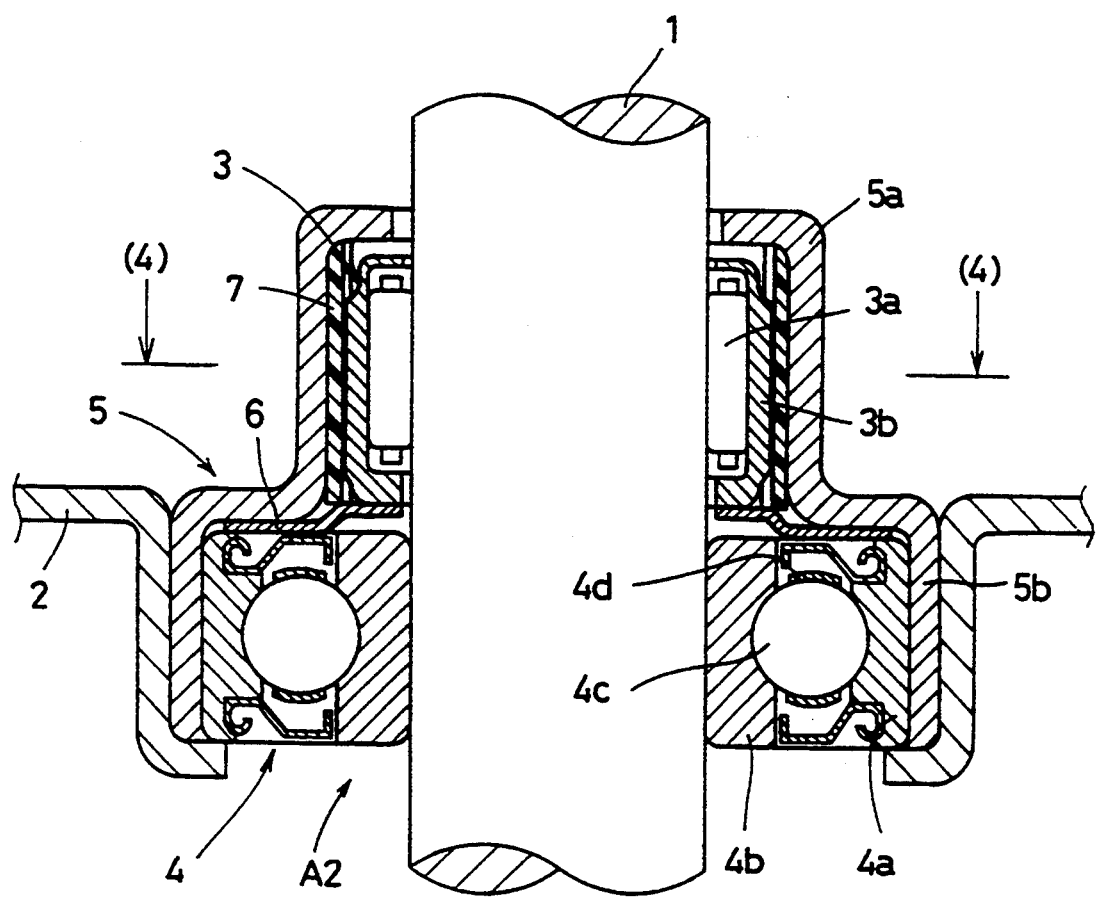
FIG. 3 is a cross-sectional view of an assembly of an overrunning clutch and a rolling bearing according to a second preferred embodiment of the present invention.
Figure 4:
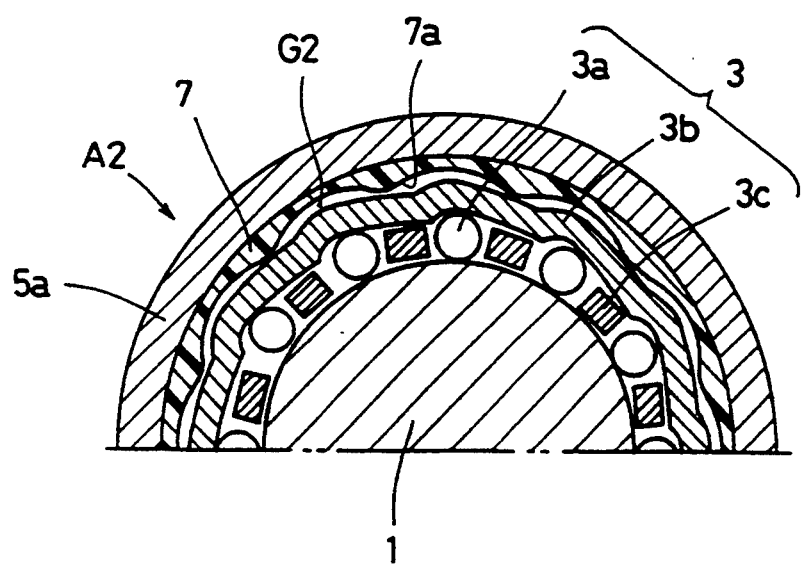
FIG. 4 is an enlarged half cross-sectional view of the assembly, taken along the line 4—4 of FIG. 3.

FIG. 3 is a cross-sectional view of an assembly of an overrunning clutch and a rolling bearing according to a second preferred embodiment of the present invention. FIG. 4 is an enlarged half cross-sectional view of the assembly, taken along the line 4—4 of FIG. 3.

In FIGS. 3 and 4, like reference numerals referred to in FIGS. 1 and 2 designate like parts.

In an assembly A2 according to the second preferred embodiment of the present invention, as shown in FIGS. 3 and 4, in order to reduce noise generation caused by the shell-type outer ring 3b of an overrunning clutch 3 coming into contact with a casing 5, a buffer bushing 7 described later is arranged therebetween.

Referring to FIGS. 3 and 4, the small diameter portion of the casing 5 has an inner peripheral surface shown in section is formed completely round. On the inner peripheral surface of the small diameter portion, a buffer bushing 7 made of a synthetic resin, rubber, or the like is fixed. The buffer bushing 7 has inwardly protruding contact portions 7a shaped like raised portions and defining concavities on the outer peripheral surface of the outer ring 3b of the overrunning clutch 3. The contact portions 7a on the buffer bushing 7 engage in the rotational direction with the outer ring 3b such that there is a radially and circumferentially minute clearance G2 between the concavities of the contact portions 7a and the outer peripheral surface of the outer ring 3b. Since the buffer bushing 7 is interposed in the inner peripheral surface of the casing 5, noise generation due to locking motion of the overrunning clutch 3 is largely reduced.

Figure 5:
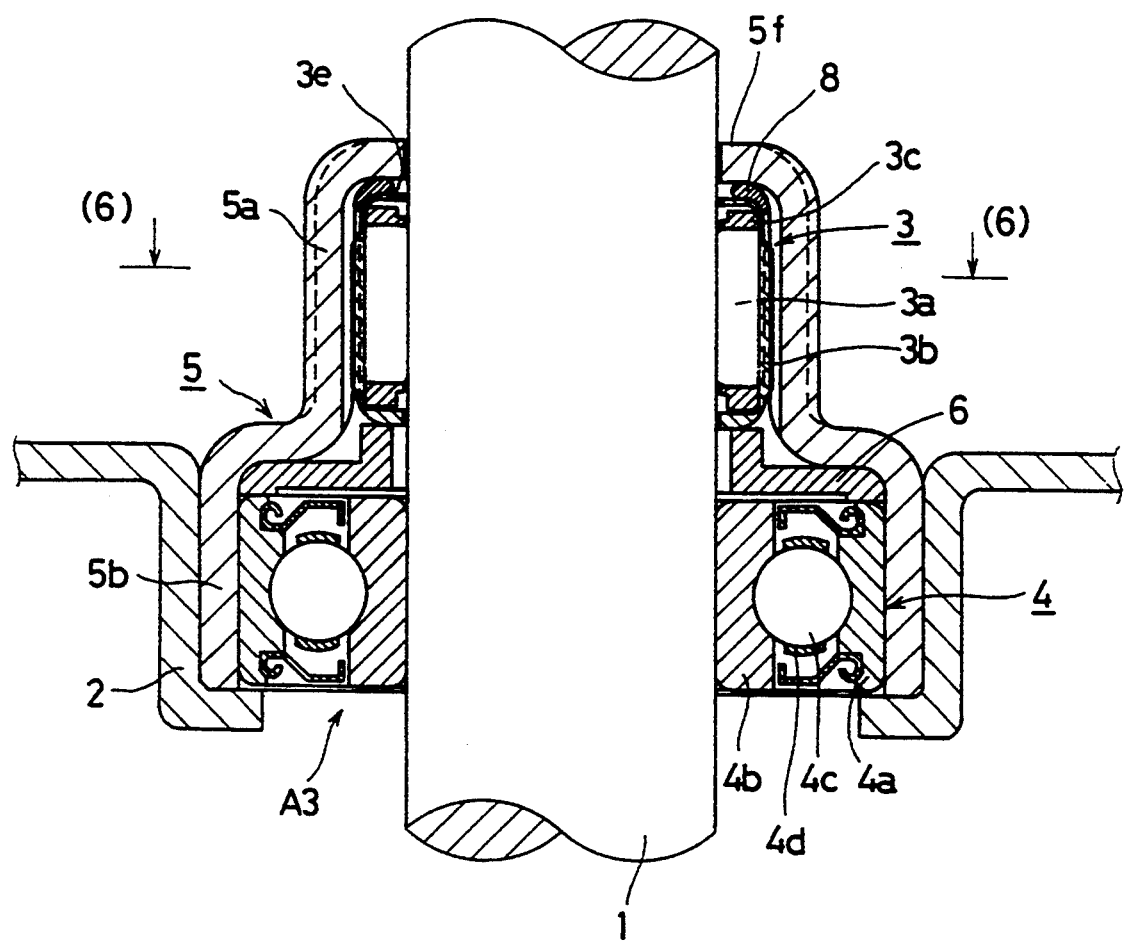
FIG. 5 is a cross-sectional view of an assembly of an overrunning clutch and a rolling bearing according to a third preferred embodiment of the present invention.
Figure 6:
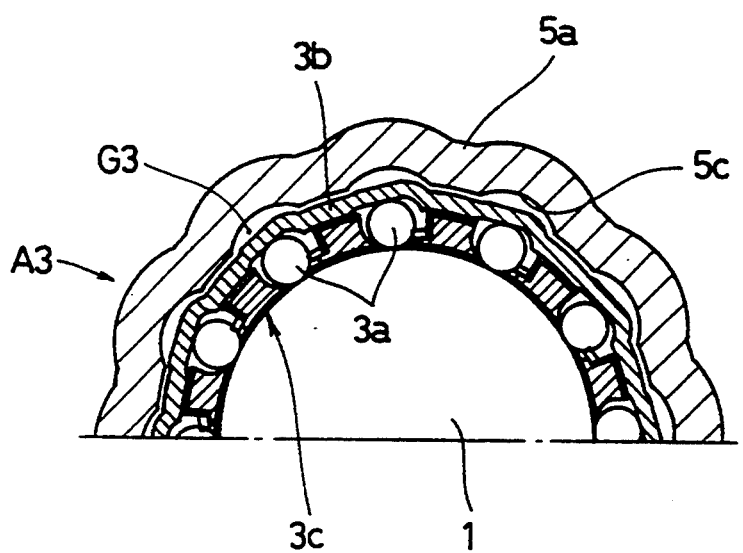
FIG. 6 is an enlarged half cross-sectional view of the assembly, taken along the line 6—6 of FIG. 5.

FIG. 5 is a cross-sectional view of an assembly of an overrunning clutch and a rolling bearing according to a third preferred embodiment of the present invention. FIG. 6 is an enlarged half cross-sectional view of the assembly, taken along the line 6—6 of FIG. 5.

In FIGS. 5 and 6, like reference numerals referred to in FIGS. 1 through 4 designate like parts.

In an assembly A3 of the third preferred embodiment of the present invention, like the above described embodiments, the small diameter portion 5a of a casing 5 has circumferentially inwardly protruding contact portions 5c that define concavities corresponding to raised portions on the outer peripheral surface of a shell-type outer ring 3b of an overrunning clutch 3. A clearance G3 is thus formed between the outer peripheral surface of the outer ring 3c and the inner peripheral surface of the small diameter portion 5a. The assembly A3 is integrated into the place wherein a rotation shaft 1 is linked to a housing 2, the casing 5 being attached to the housing 2.

With this arrangement, the overrunning clutch 3 may move slightly radially within the range that the clearance G3 allows, thereby being automatically centered.

In the third preferred embodiment of the present invention, an elastic ring 8 such as an O-ring is interposed between the overrunning clutch 3 and the casing 5 to prevent the overrunning clutch 3 from becoming shaky in the casing 5. The elastic ring 8 is interposed in a predetermined compressed state, as will be described in detail later, between a corner surface of a radially inward flange 3e of the outer ring 3b of the overrunning clutch 3 and the inner peripheral surface of a radially outward flange 5f of the small diameter portion 5a of the casing 5.

When the assembly A3 is integrated into the place wherein the rotation shaft 1 is linked to the housing 2, the overrunning clutch 3 is bound to move radially and circumferentially due to frictional resistance of the elastic ring 8. Accordingly, the overrunning clutch 3 is bound to move circumferentially to the casing 5 when the rotation direction of the rotation shaft 1 is switched.

In the process that the assembly A3 is integrated since the power that the overrunning clutch 3 acts on the rotation shaft 1 due to the above-mentioned centering necessarily exceeds the frictional resistance, the centering of the overrunning clutch 3 is smoothly performed.

In the assembly A3 of the third embodiment, the elastic ring 8 is placed under a compressed state so that the frictional resistance of the elastic ring 8 may be smaller than a transmission torque at the locking state of the overrunning clutch 3 but larger than a drag torque at the unlocking state. When the overrunning clutch 3 is first locked after the insertion of the rotation shaft 1 due to the frictional resistance of the elastic ring 8, the overrunning clutch 3 itself is moved a certain distance circumferentially within the small diameter portion 5a of the casing 5. The overrunning clutch 3 is slowly moved due to the frictional resistance of the elastic ring 8, whereby the overrunning clutch 3 does not strongly collide against the casing 5 to the extent that noise is produced.

Further, in the third embodiment of the present invention, a buffer 7' made of a synthetic resin or the like may be coated over the inner peripheral surface of the casing 5 and/or the outer peripheral surface of the overrunning clutch 3.

Such a coating of the buffer 7' prevents metallic contact between the outer ring 3b of the overrunning clutch 3 and the small diameter portion 5a of the casing 5 when the overrunning clutch 3 collides against the small diameter portion 5a of the casing 5 when the overrunning clutch 3 is moved at the time of its initial locking motion.

Figure 7:
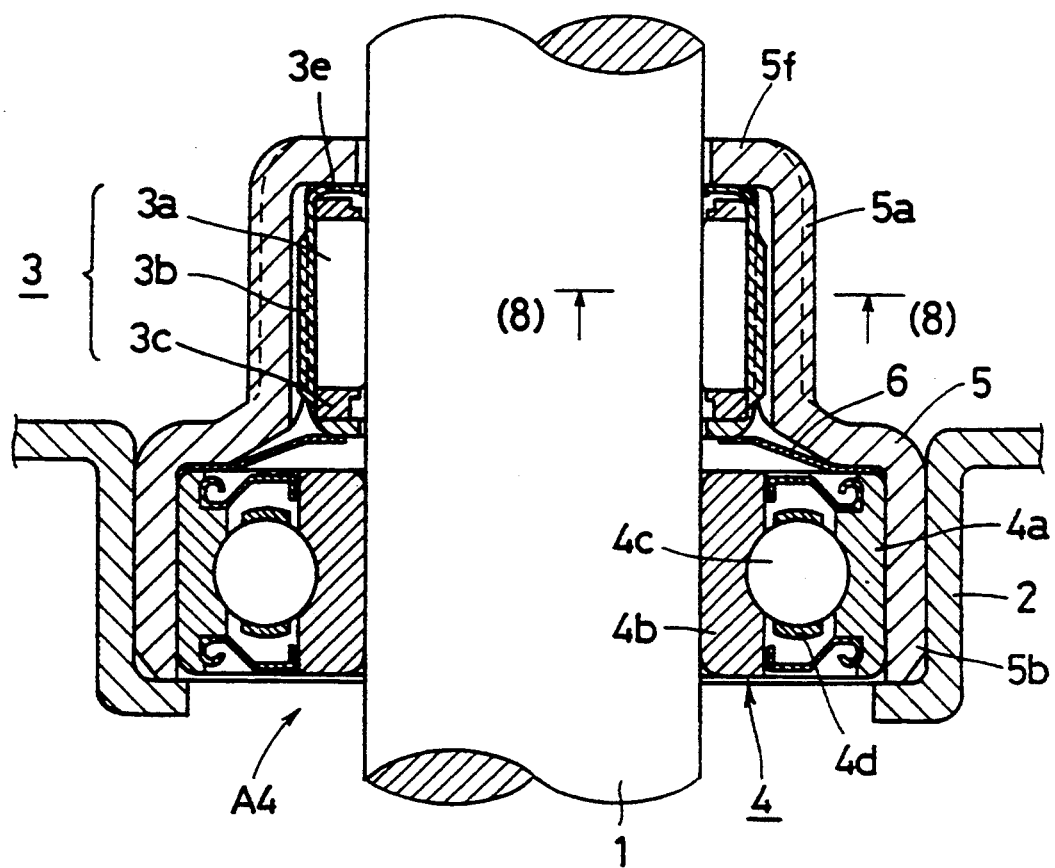
FIG. 7 is a cross-sectional view of an assembly of an overrunning clutch and a rolling bearing according to a fourth preferred embodiment of the present invention.
Figure 8:
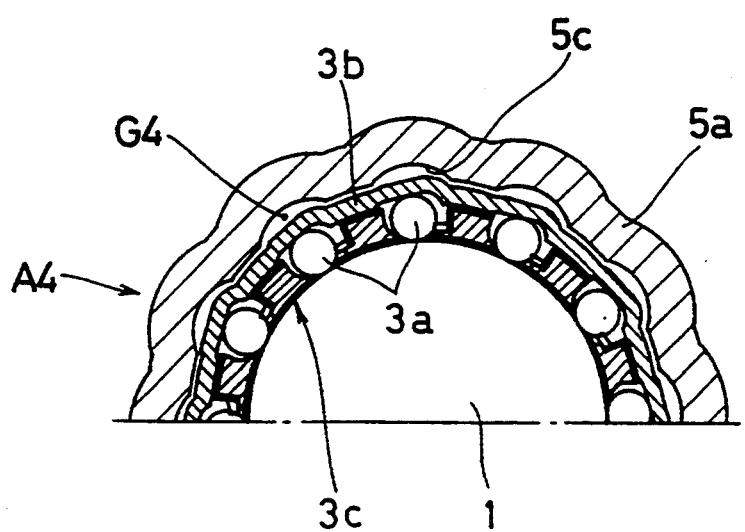
FIG. 8 is an enlarged half cross-sectional view of the assembly, taken along the line 8—8 of FIG. 7.

FIG. 7 is a cross-sectional view of an assembly of an overrunning clutch and a rolling bearing according to a fourth preferred embodiment of the present invention. FIG. 8 is an enlarged half cross-sectional view of the assembly, taken along the line 8—8 of FIG. 7.

In FIGS. 7 and 8, like reference numerals referred to in FIGS. 1 through 6 designate like parts.

In an assembly A4 of the fourth preferred embodiment of the present invention, like the above described embodiments, the small diameter portion 5a of a casing 5 has circumferentially inwardly protruding contact portions 5c that define concavities corresponding to raised portions on the outer peripheral surface of a shell-type outer ring 3b of a overrunning clutch 3. With this arrangement, a clearance G4 is formed between the outer peripheral surface of the outer ring 3c and the inner peripheral surface of the small diameter portion 5a. The assembly A4 is integrated into the place wherein a rotation shaft 1 is linked to a housing 2, with the casing 5 being attached to the housing 2. With this arrangement, the overrunning clutch 3 is slightly moved radially within the range that the clearance G4 allows, and the overrunning clutch 3 thus is automatically centered.

In the fourth preferred embodiment of the present invention, the spacer 6 further acts as a ring spring. The spacer 6 is interposed between the overrunning clutch 3 and the roller bearing 4 to press a flange 3e of the outer ring 3b of the overrunning clutch 3 against an radially inward flange 5f of the small diameter portion 5a of the casing 5.

When the assembly A4 is integrated into the place wherein the rotation shaft 1 is linked to the housing 2, the overrunning clutch 3 is bound to a certain extent to move radially and circumferentially due to the frictional resistance produced. The resistance is due to a tight contact between the end surface of the outer ring 3b of the overrunning clutch 3 and the flange 5f of the small diameter portion 5a of the casing 5. Accordingly, the overrunning clutch 3 is bound to move circumferentially to the casing 5 at the time when rotation direction of the rotation shaft 1 is switched.

In the process of the assembly A3 being integrated the power caused by the above-automatic centering of the overrunning clutch 3 necessarily exceeds the frictional resistance. The centering as a result is smoothly performed.

The above frictional resistance is set so as to be smaller than a transmission torque at the locking state of the overrunning clutch 3 but larger than a drag torque at the unlocking state. When the overrunning clutch 3 is first locked after the insertion of the rotation shaft 1 due to the frictional resistance, the overrunning clutch 3 itself is moved a certain distance circumferentially within the small diameter portion 5a of the casing 5. The overrunning clutch 3 however is slowly moved due to the frictional resistance, whereby the overrunning clutch 3 does not strongly collide against the casing 5 to the extent that noise is produced.

Figure 9:
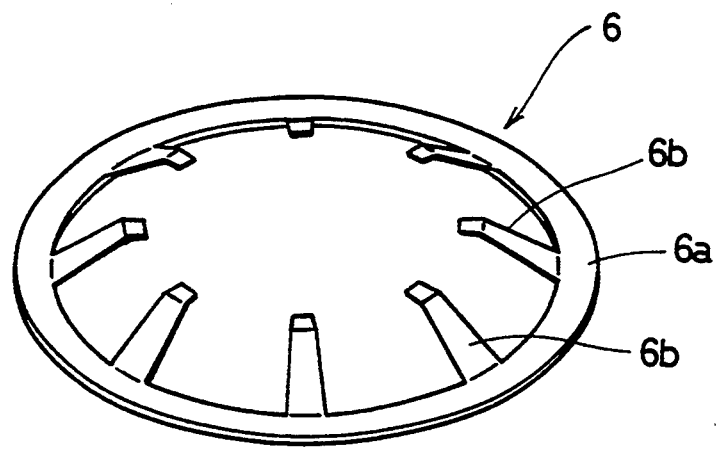
FIG. 9 is a perspective view of a spacer of the assembly shown in FIG. 7.
Figure 10:
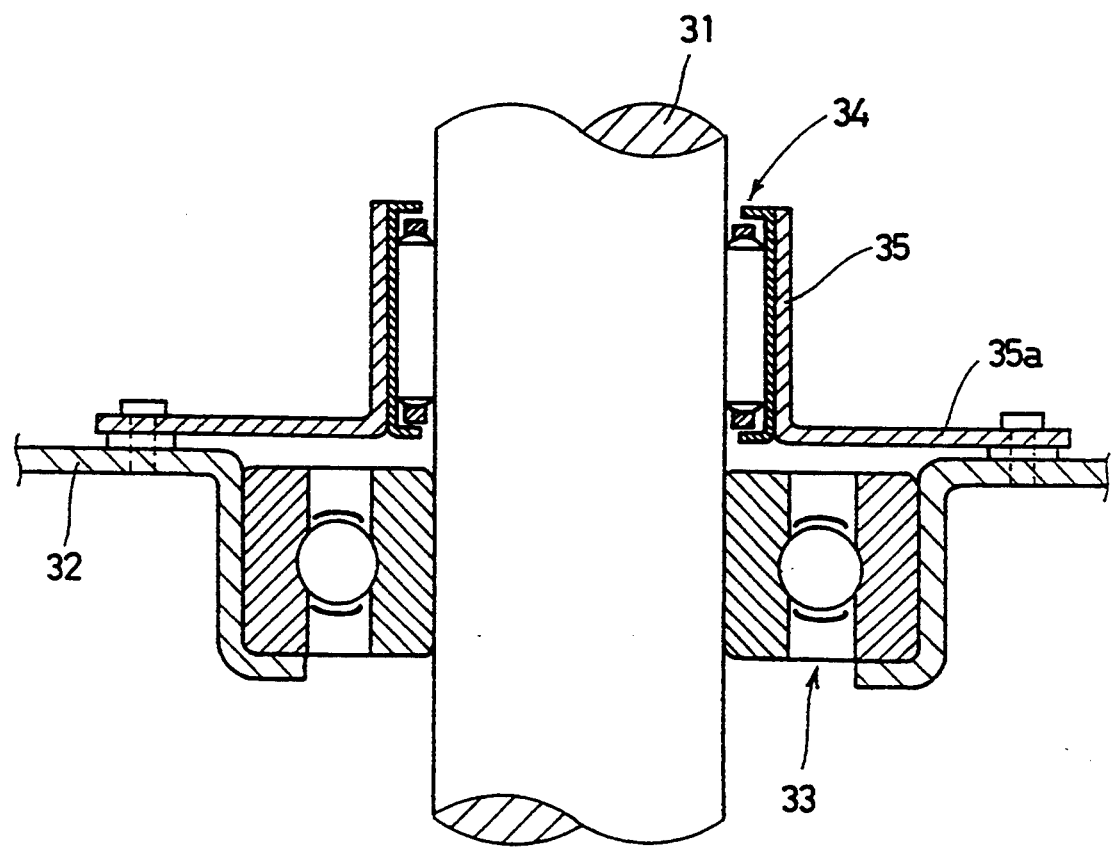
FIG. 10 is a cross-sectional view of a conventional assembly.

Further, in the fourth embodiment of the present invention, the spacer 6 may be a substitute for a spacer which needs to be positioned between the overrunning clutch 3 and the rolling bearing 4 assembled. As shown in FIG. 9, the spacer 6 may comprise of an annular plate 6a and spring arms 6b integrated with the annular plate 6a at the several circumferential points thereof. The spring arms 6b may be made from rubber. A buffer 7' made of a synthetic resin or the like may be coated over the inner pripheral surface of the casing 5 and/or the outer pripheral surface of the overrunning clutch 3.

Such a buffer 7' prevents metallic contact between the outer ring 3b of the overrunning clutch 3 and the small diameter portion 5a of the casing 5 when the overrunning clutch 3 collides against the small diameter portion 5a of the casing 5 where the overrunning clutch 3 is moved at the time of its initial lock motion.

While only certain embodiments of the present invention have been described, it will be apparent to those skilled in the art that various changes and modifications may be made therein without departing from the spirit and scope of the present invention as claimed.

FIG. 11a shows how the buffer 7' may be coated on the inner peripheral surface of casing 5 in the small diameter portion 5a. FIG. 11b shows how the buffer may be coated on the outer peripheral surface of the overrunning clutch 3. FIG. 11c shows how the buffer may be formed on both the casing 5 and the overrunning clutch 3.

What is claimed is:

1. An assembly comprising:
    an overrunning clutch having a shell-type outer ring, said outer ring having raised portions at circumferential points on an outer peripheral surface thereof;
    a rolling bearing positioned adjacent the overrunning clutch in the axial direction of a rotation shaft; and
    a casing for supporting and covering the overrunning clutch and the rolling bearing, said casing having an overrunning clutch-supporting portion and a rolling bearing-supporting portion at an adjoining position in the axial direction, respectively, and
    said overrunning clutch-supporting portion having inwardly protruding portions on the inner peripheral surface thereof to form concavities corresponding to the raised portions on the outer peripheral surface of the outer ring of the overrunning clutch, the concavities inter-engaging with the raised portions of the outer ring thereby defining a clearance therebetween in a direction of rotation of the outer ring.

2. The assembly as set forth in claim 1, further comprising a buffer coated over at least one of the inner peripheral surface of the casing and the outer peripheral surface of the outer ring of the overrunning clutch.

3. The assembly as set forth in claim 1, further comprising a spacer interposed between the overrunning clutch and the rolling bearing.

4. The assembly as set forth in claim 1, wherein said clutch supporting portion of said casing includes a buffer bushing fixed on the inner peripheral surface of the overrunning clutch-supporting portion of the casing, said buffer bushing forming the inwardly protruding portions on the inner peripheral surface thereof and thereby forming the concavities, said concavities inter-engaging with the raised portions on the outer peripheral surface of the outer ring of the overrunning clutch to define the clearance therebetween.

5. An assembly comprising:
    an overrunning clutch having a shell type outer ring, said outer ring having raised portions at circumferential points on an outer peripheral surface thereof;
    a rolling bearing positioned adjacent the overrunning clutch in the axial direction of a rotation shaft;
    a casing for supporting and covering the overrunning clutch and the rolling bearing, said casing having an overrunning clutch-supporting portion and a rolling bearing-supporting portion at an adjoining position in the axial direction, respectively, said overrunning clutch-supporting portion having inwardly protruding portions on the inner peripheral surface thereof to form concavities corresponding to the raised portions on the outer peripheral surface of the outer ring of the overrunning clutch, the concavities inter-engaging with the raised portions thereby defining a clearance therebetween in a direction of rotation of the outer ring; and
    an elastic ring interposed in a predetermined compressed state between the outer ring of the overrunning clutch and the overrunning clutch-supporting portion of the casing.

6. The assembly as set forth in claim 5, wherein the elastic ring is compressed so that the frictional resistance of the elastic ring is smaller than a transmission torque of the overrunning clutch at the time of lock but larger than a drag torque of the overrunning clutch at the time of unlock.

7. The assembly as set forth in claim 5, wherein the outer ring of the overrunning clutch and the overrunning clutch-supporting portion of the casing each have radially inward flanges, the elastic ring being interposed in a predetermined compressed state between both of the flanges.

8. The assembly as set forth in claim 5, wherein the elastic ring is an O-ring.

9. The assembly as set forth in claim 5, further comprising a buffer coated over at least one of the inner peripheral surface of the casing and the outer peripheral surface of the outer ring of the overrunning clutch.

10. An assembly comprising;
    an overrunning clutch having a shell type outer ring, said outer ring having raised portions at circumferential points on the outer peripheral surface thereof;
    a rolling bearing positioned adjacent the overrunning clutch in the axial direction of a rotation shaft;

a casing for supporting and covering the overrunning clutch and the rolling bearing, said casing having an overrunning clutch-supporting portion and a rolling bearing-supporting portion at an adjoin position in the axial direction, respectively, said overrunning clutch-supporting portion having inwardly protruding portions on the inner peripheral surface thereof to form concavities corresponding to the raised portions on an outer peripheral surface the outer ring of the overrunning clutch, the concavities inter-engaging with the raised portions of the outer ring thereby defining a clearance therebetween in a direction of rotation of the outer ring; and a spacer interposed between the outer ring of the overrunning clutch and the overrunning clutch-supporting portion of the casing for pressing the outer ring against the overrunning clutch supporting portion.

11. The assembly as set forth in claim 10, wherein the spacer is set so as to press the outer ring of the overrunning clutch so that the frictional resistance of the spacer is smaller than a transmission torque of the overrunning clutch at the time of lock but larger than a drag torque of the overrunning clutch at the time of unlock.

12. The assembly as set forth in claim 10, wherein the spacer is a spring ring.

13. The assembly as set forth in claim 10, wherein the spacer comprises an annular plate and spring arms mounted to the annular plate at circumferential points thereof.

14. The assembly as set forth in claim 10, wherein the spacer comprises an annular plate and spring arms made of rubber mounted to the annular plate at circumferential points thereof.

15. The assembly as set forth in claim 10, further comprising a buffer coated over at least one of the inner peripheral surface of the casing and the outer peripheral surface of the outer ring of the overrunning clutch.

* * * * *